United States Patent [19]
Fullerton

[11] Patent Number: 5,832,035
[45] Date of Patent: Nov. 3, 1998

[54] FAST LOCKING MECHANISM FOR CHANNELIZED ULTRAWIDE-BAND COMMUNICATIONS

[75] Inventor: Larry W. Fullerton, Huntsville, Ala.

[73] Assignee: Time Domain Corporation, Huntsville, Ala.

[21] Appl. No.: 761,602

[22] Filed: Dec. 6, 1996

Related U.S. Application Data

[63] Continuation of Ser. No. 487,990, Jun. 7, 1995, abandoned, which is a continuation-in-part of Ser. No. 309,973, Sep. 20, 1994, Pat. No. 5,677,927, and a continuation-in-part of Ser. No. 428,489, Apr. 27, 1995, Pat. No. 5,687,169.

[51] Int. Cl.[6] .................................................. H04B 1/69
[52] U.S. Cl. ........................ 375/210; 375/208; 375/355
[58] Field of Search .................................. 375/208, 210, 375/327, 355, 367, 371

[56] References Cited

U.S. PATENT DOCUMENTS

| | | | |
|---|---|---|---|
| 3,720,950 | 3/1973 | Vehrs, Jr. | 343/17.2 PC |
| 3,728,632 | 4/1973 | Ross | 325/38 R |
| 3,864,635 | 2/1975 | Ewanus | 325/421 |
| 4,279,018 | 7/1981 | Carson | 375/208 |
| 4,550,414 | 10/1985 | Guinon et al. | 375/209 |
| 4,641,317 | 2/1987 | Fullerton | 375/1 |
| 4,688,232 | 8/1987 | Fox | 375/87 |
| 4,743,906 | 5/1988 | Fullerton | 342/27 |
| 4,813,057 | 3/1989 | Fullerton | 375/37 |
| 4,979,186 | 12/1990 | Fullerton | 375/23 |
| 5,031,191 | 7/1991 | Hiramatsu et al. | 375/307 |
| 5,105,437 | 4/1992 | Kingston et al. | 375/208 |
| 5,214,669 | 5/1993 | Zarembowitch | 375/1 |
| 5,363,108 | 11/1994 | Fullerton | 342/27 |

FOREIGN PATENT DOCUMENTS

WO 91/06155 5/1991 France .
31 31 186 A1 2/1983 Germany .

Primary Examiner—Temesghen Ghebretinsae
Attorney, Agent, or Firm—Sterne, Kessler, Goldstein & Fox PLLC

[57] ABSTRACT

A receiver for acquisition and lock of an impulse radio signal comprising an adjustable time base to output a sliding periodic timing signal having an adjustable repetition rate, and a decode timing modulator to output a decode signal in response to the periodic timing signal. The impulse radio signal is cross correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by a one or more extra counts after each T pulses is reached in order to shift the PN code modulo for proper phase alignment of the periodic timing signal and the received impulse radio signal.

15 Claims, 12 Drawing Sheets

FAST LOCKING MECHANISM FOR CHANNELIZED ULTRAWIDE-BAND COMMUNICATIONS

CROSS-REFERENCE TO RELATED APPLICATION

This application is a continuation of application Ser. No. 08/487,990, filed Jun. 7, 1995 which is a continuation-in-part of commonly owned, co-pending U.S. Pat. applications Ser. No. 08/309,973 filed Sep. 20, 1994, entitled "An Ultrawide-Band Communication System and Method," and No. 08/428,489 filed Apr. 27, 1995, entitled "Full Duplex Ultrawide-Band Communication System and Method," which are incorporated herein by reference and to which 35 U.S.C. § 120 priority is hereby claimed.

FIELD OF THE INVENTION

1. Field of the Invention

The present invention relates to the field of communications, and more particularly, the present invention relates to a fast locking mechanism for channelized ultrawide-band communications.

2. Related Art

Conventional transceivers operating with narrow band signals typically use the same antenna to transmit and receive signals. The transmit and receive signals are usually the same or very close in frequency. Switching between the transmit and receive mode can be done at very high rates, depending on the density of each packet of data.

Full duplex operation has traditionally been accomplished by either frequency domain or a time domain multiple access (FDMA or TDMA). In order to isolate the transmitter and receiver, FDMA uses frequency filters and hybrids, while TDMA uses a duty cycle scheme in which the transmitter and receiver alternate operation.

An example of an FDMA full duplex voice communication system is an amateur radio transceiver that operates with different transmit and receive frequencies. For example, the separated frequencies could be 144 Mhz and 436 Mhz. In such a system, the antennas are usually different, and filters must be used in the receiver to eliminate transmitter noise from the adjacent transmit antenna. Otherwise, the receiver could easily be overloaded by its own transmitter.

Impulse radio technology, on the other hand, is ultrawide-band by definition. The original descriptions of impulse radio may be found in a number of United States Patents by the present inventor. Three of these are U.S. Pat. Nos. 4,641,317 (issued Feb. 3, 1987), 4,813,057 (issued Mar. 14, 1989) and 4,979,186 (issued Dec. 18, 1990). Because of the ultrawide-band characteristics of impulse radio, it is difficult to modify impulse radio systems to use conventional duplex schemes.

In order to achieve full duplex in impulse radio technology, separate transmit and receive antennas are required for hand-held transceiver applications. This is because the receiver can not be disconnected from the antenna fast enough to permit transmission using the same antenna. Therefore, the size of the impulse radio antennas must be relatively small.

An impulse radio system with many users communicating with one another requires that they all have the same size antennas. In addition, for impulse radio communications in the same bandwidth, it is assumed that the transmit and receive antennas are the same size as well. These constraints complicate the implementation of full duplex in impulse radio technology, because both the transmitter and receiver are usually operated in the same ultrawide frequency bandwidth.

In order for pairs of uses to simultaneously communicate independently, some form of channelization is required to avoid cross-talk. One channelization technique is to use different pulse repetition rates for each pair of transceivers that communicate in proximity of other transceivers. This technique, however, has limited channel capacity a limited discrete pulse repetition rates are actually available for impulse radio communications and may interfere with other communication services.

A second approach to channelization is to use different pseudo random noise (PN) codes. According to this technique, the number of channels for impulse radio communications is only limited by the complexity and uniqueness of orthogonal (i.e., non-interfering) PN codes. The inherent complexity of using PN codes for channelization is that the codes must be identifiable (i.e., acquisitioned and locked) and decoded in a short period of time for full duplex communications to be realized.

What is needed for this PN coded approach is an acquisition mechanism that is applicable to impulse radio technology, and that permits fast locking of impulse radio signals.

SUMMARY OF THE INVENTION

The present invention is directed to a fast locking mechanism for channelized ultrawide-band communications in a an impulse radio receiver. An acquisition and lock method includes sliding a periodic timing signal. A decode signal is produced using the periodic timing signal, wherein successive decode signals are coded by successive chips of a pseudo noise (PN) code having a predetermined modulo length. A received impulse radio signal is cross correlated with the decode signal to output a baseband signal. T samples of the baseband signal are integrated to output an integration result that is then compared with a threshold value to output a channel coincidence signal.

If channel coincidence (i.e., acquisition) is detected, a constant rate-control signal is output to stop the periodic timing signal from sliding. Otherwise, the periodic timing signal is adjusted, and successive trials of T pulses of the periodic timing signal are integrated and threshold detected until channel coincidence is detected. Typically, the process is stop acquisition if the entire PN code modulo length is completed before channel coincidence is detected.

A receiver for acquisition and lock of an impulse radio signal comprises an adjustable time base to output the periodic timing signal having an adjustable repetition rate, and a decode timing modulator to output the decode signal in response to the periodic timing signal. A cross correlator in the receiver cross correlates the impulse radio signal with the decode signal to output a baseband signal.

The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by a one or more extra counts. This count adjustment is made after each T pulses is reached in order to shift the PN code modulo for proper phase alignment of the periodic timing signal and the received impulse radio signal.

In an alternative embodiment, plural decode signals are generated and are cross correlated with received impulse radio signals using a plurality of cross correlators to reduce the time to acquire channel lock. In still a further embodiment, a fast cross correlator can be used.

BRIEF DESCRIPTION OF THE FIGURES

In the drawings, like reference numbers indicate identical or functionally similar elements. Additionally, the left-most digit of the reference number identifies the drawing in which the reference number first appears.

DETAILED DESCRIPTION OF THE PREFERRED EMBODIMENTS

Table of Contents

Figure 1B:
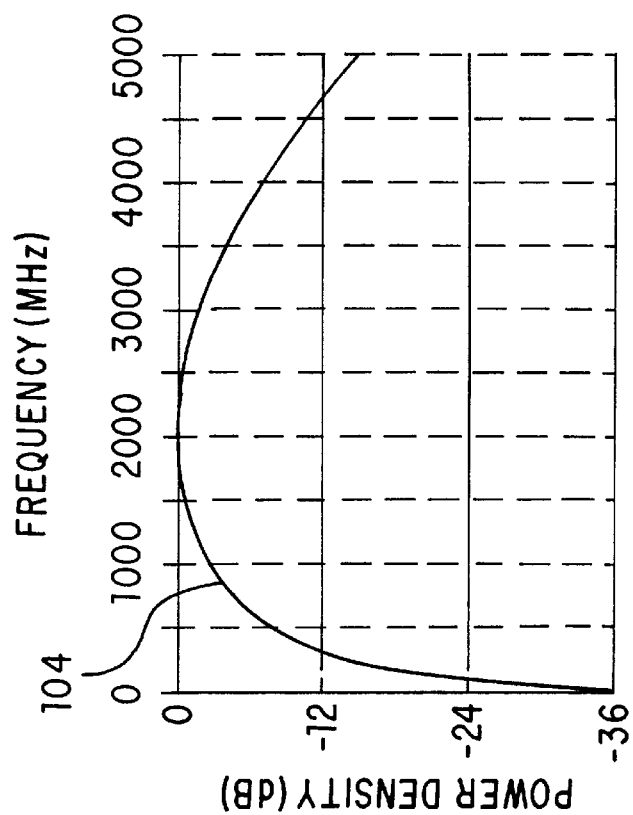
FIGS. 1A and 1B show a 2 GHz center frequency monocycle pulse in the time and frequency domains, respectively, in accordance with the present invention.

I. Overview . . . 8
II. Technology Basics . . . 9
A. Gaussian Monocycle . . . 10
B. A Pulse Train . . . 11
C. Modulation . . . 12
D. Coding for Energy Smoothing and Channelization . . . 13
E. Reception and Demodulation . . . 14
F. Jam Resistance . . . 14
G. Processing Gain . . . 15
H. Capacity . . . 16
I. Multipath and Propagation . . . 17
III. Fast Locking Mechanism for Channelized Ultrawideband Communications . . . 19
IV. Fast Locking Analysis and Operation . . . 24
V. Conclusion . . . 26

I. Overview

Impulse radios generally have: short duration pulses; center frequencies typically between 50 MHz and 10 gigahertz (GHz); ultrawide bandwidths of 100+% of the center frequency; multi-mile ranges with sub-milliwatt average power levels, even with low gain antennas; extremely low power spectral densities; lower cost than other sophisticated radio designs, especially spread spectrum systems; and excellent immunity to jamming from other systems and to multipath fading.

Impulse radios have exceptional multipath immunity and are relatively simple and less costly to build, especially in comparison to spread spectrum radios. Impulse radio systems consume substantially less power than existing conventional radios. Additionally, impulse radio systems occupy less space than existing portable telecommunications transceivers. Because of these characteristics, impulse radio is an optimal technology for a wide variety of applications, including personal communications systems and in-building communications systems.

Copending, commonly assigned U.S. patent application Ser. No. 08/309,973; U.S. Pat. No. 5,677,927 (filed Sep. 20, 1994, and titled An Ultrawide-Band Communication System and Method; which is incorporated herein by reference and referred to as the '973 application) describes the following impulse radio features: the use of impulse radio subcarriers; the time modulator that is used for code time delaying and subcarrier time delaying; linearization of the time modulator; pseudo Manchester coding for modulation of digital data using impulse radio communications; and a lock acquisition scheme for the impulse radio receiver to acquire and maintain lock of impulse radio signals. A full duplex impulse radio system is described in copending, commonly assigned U.S. patent application Ser. No. 08/428,489 U.S. Pat. No. 5,687,163 (Attorney Docket No. 1321.0150000) (filed Apr. 27, 1995, and titled Full Duplex Ultrawide-Band Communication System and Method, which is also incorporated herein by reference).

The following sections II and III are a detailed description of the present invention.

Section II is directed to technology basics and provides the reader with an introduction to impulse radio concepts, as well as other relevant aspects of communications theory. Section III is directed to a fast locking mechanism for channelized ultrawide-band communications, according to the present invention.

II. Technology Basics

As stated above, this section is directed to technology basics and provides the reader with an introduction to impulse radio concepts, as well as other relevant aspects of communications theory. This section includes subsections relating to Gaussian monocycle pulses, pulse trains of gaussian monocycle pulses, modulation, coding, and qualitative and quantitative characteristics of these concepts.

Impulse radio transmitters emit short Gaussian monocycle pulses with a tightly controlled average pulse-to-pulse interval. Impulse radio transmitters use a monocycle pulse width of between 20 and 0.1 nanoseconds (ns) and pulse-to-pulse intervals of between 2 and 5000 ns. These narrow monocycle pulses have inherently wide-band frequency characteristics.

Impulse radio systems uses pulse position modulation, with the actual pulse-to-pulse interval being varied on a pulse-by-pulse basis by two components: an information component and a pseudo-random code component. Unlike spread spectrum systems, the pseudo-random code is not necessary for energy spreading (because the impulses themselves are inherently wide-band), but rather for channelization, energy smoothing in the frequency domain, and jamming resistance.

The impulse radio receiver is a direct conversion receiver with a cross correlator front end. The front end coherently converts the electromagnetic pulse train to a baseband signal in one stage. The impulse radio receiver integrates multiple pulses to recover each bit of the transmitted information.

A. Gaussian Monocycle

Figure 1A:
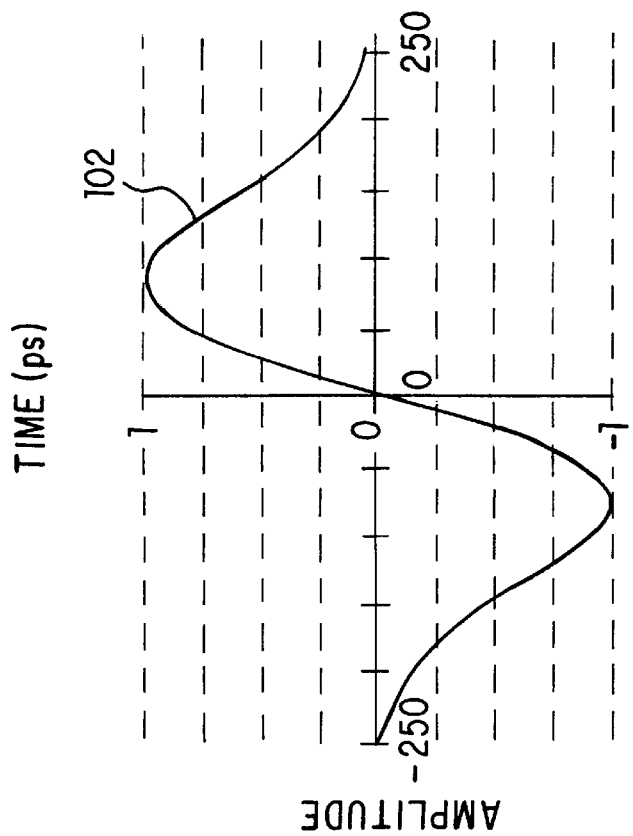

The most basic element of impulse radio technology is the practical implementation of Gaussian monocycles, which are also referred to herein as Gaussian monocycle pulses. A Gaussian monocycle is the first derivative of the Gaussian function. FIGS. 1A and 1B show a 2 GHz center frequency (i.e., a 0.5 ns pulse width) monocycle pulse in the time and frequency domains (see 102 and 104, respectively). (Actual practice prevents the transmission of a perfect Gaussian monocycle. In the frequency domain, this results in a slight reduction in the signal's bandwidth.) These monocycles, which are sometimes called impulses, are not gated sine waves.

The Gaussian monocycle waveform is naturally a wide bandwidth signal, with the center frequency and the bandwidth completely dependent upon the pulse's width. In the time domain, the Gaussian monocycle is described mathematically by:

$$V(t) = A \frac{\sqrt{2e}}{\tau} t e^{\left(-\frac{t}{\tau}\right)^2} \quad (1)$$

Where, A is the peak amplitude of the pulse, t is time, and τ (tau) is a time decay constant.
In the frequency domain, the Gaussian monocycle envelope is:

$$V(\omega) = A\omega\tau^2 \sqrt{2\pi e} \; e^{-\frac{\omega^2 \tau^2}{2}} \quad (3)$$

The center frequency is then:

$$fc = \frac{1}{2\pi\tau} \text{ Hz} \quad (4)$$

Relative to c, the 3 dB down points (power) are:

$$f_{lower} = 0.319 \text{ c}; \; f_{upper} = 1.922 \text{ c}. \quad (5)$$

Thus, the bandwidth is approximately 160% of the center frequency. Because τ (tau) also defines the pulse width, then the pulse width specifies both the center frequency and bandwidth. In practice, the center frequency of a monocycle pulse is approximately the reciprocal of its length, and its bandwidth is approximately equal to 1.6 times the center frequency. Thus, for the "0.5 ns" pulse shown in FIGS. 1A and 1B:

$$f_c = 2.0 \text{ GHz}; \; \Delta f_c = 3.2 \text{ GHz}. \quad (7)$$

B. A Pulse Train

Impulse radio systems use pulse trains, not single pulses, for communications. As described in detail in Section III below, the impulse radio transmitter produces and outputs a train of pulses for each bit of information.

Figure 2B:
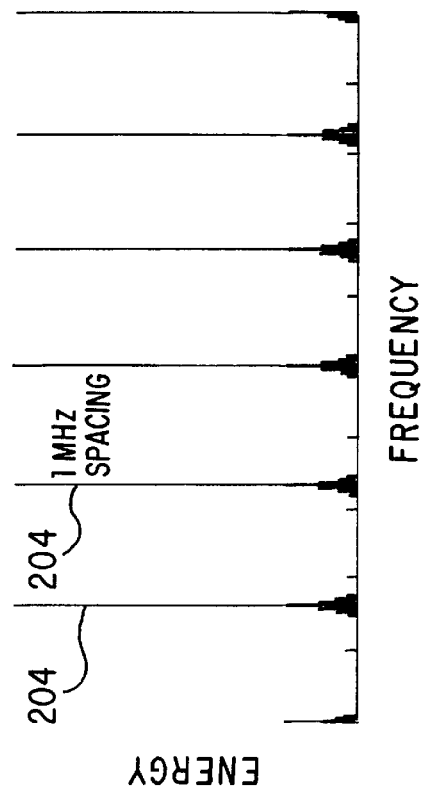
FIGS. 2A and 2B are illustrations of a 1 mpps system with 1 ns pulses in the time and frequency domains, respectively, in accordance with the present invention.
Figure 2A:
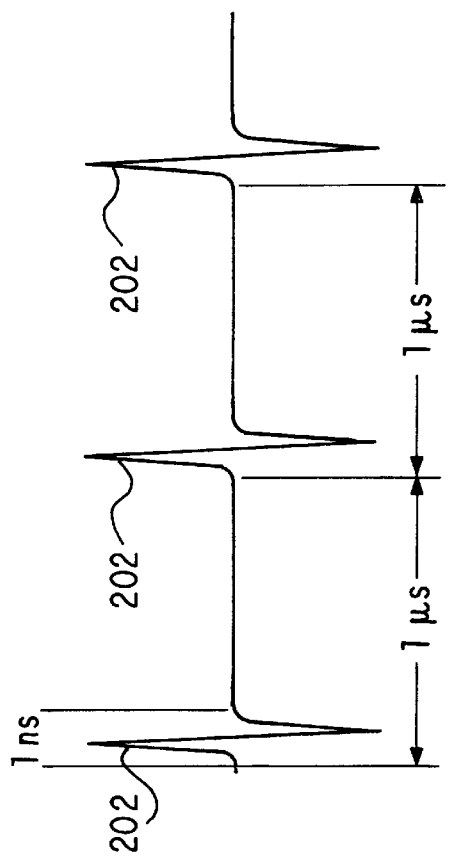

Prototypes built by the inventors have pulse repetition frequencies of between 0.7 and 10 megapulses per second (mpps, where each megapulse is $10^6$ pulses). FIGS. 2A and 2B are illustrations of a 1 mpps system with (uncoded, unmodulated) 1 ns pulses in the time and frequency domains (see 102 and 104, respectively). In the frequency domain, this highly regular pulse train produces energy spikes (comb lines 204) at one megahertz intervals; thus, the already low power is spread among the comb lines 204. This pulse train carries no information and, because of the regularity of the energy spikes, might interfere with conventional radio systems at short ranges.

Impulse radio systems have very low duty cycles so the average power in the time domain is significantly lower than the peak power in the time domain. In the example in FIGS. 2A and 2B, for example, the impulse transmitter operates 0.1% of the time (i.e., 1 ns per microsecond (μs)).

Additional processing is needed to modulate the pulse train so that the impulse radio system can actually communicate information. The additional processing also smooths the energy distribution in the frequency domain so that impulse radio transmissions (e.g., signals) interfere minimally with conventional radio systems.

C. Modulation

Figure 3:
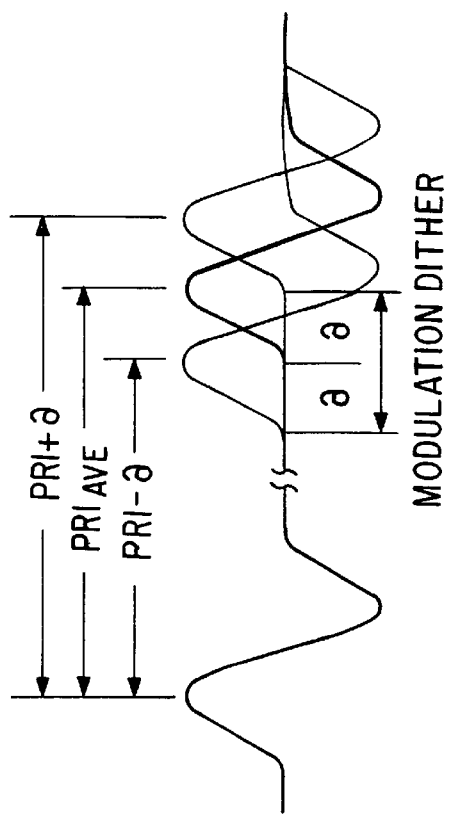
FIG. 3 illustrates a modulating signal that changes the pulse repetition interval (PRI) in proportion to the modulation in accordance with the present invention.

Amplitude and frequency/phase modulation are unsuitable for this particular form of impulse communications; the only suitable choice is pulse position modulation, which allows the use of a matched filter (i.e., cross correlator) in the receiver. As illustrated in FIG. 3, a modulating signal changes the pulse repetition interval (PRI) in proportion to the modulation.

If the modulating signal were to have three levels, the first level might shift the generation of the pulse forward in time from the nominal by ∂ picoseconds (ps); the second level might not shift the pulse position in time from the nominal at all; and the third level might delay the pulse by ∂ ps. This would be a digital modulation scheme. Analog modulation would allow continuous deviations between PRI-∂ and PRI+∂. In the impulse radio system the maximum value of ∂ is t/4, where t=time of the pulse. The time measurement is assumed to be taken from the same part of the monocycle waveform on successive monocycles.

In the frequency domain, pulse position modulation distributes the energy over more frequencies. For example, in the case of a 1 mpps system where the modulation dither (d) is 100 ps, the PRI is 1,000,000 Hertz (Hz) and the additional frequency components are: 999,800.04 Hz, 999,900.01 Hz, 1,000,100.01 Hz, and 1,000,200.04 Hz. (Dither is an impulse radio communications term for moving the position of a pulse in time.) Transmitted energy is now distributed among more spikes (comb lines) in the frequency domain. If the total transmitted energy remains constant, the energy in each frequency spike decreases as the number of possible pulse positions increases. Thus, in the frequency domain, the energy is more smoothly distributed.

D. Coding for Energy Smoothing and Channelization

Because the receiver is a cross correlator, the amount of time position modulation required for one-hundred percent modulation is calculated by the inverse of $f_c/4$ (where $f_c$ is the center frequency). For a monocycle with a center frequency of 1.3 GHz, for example, this corresponds to ±157 (ps) of time position modulation. The spectrum-smoothing effects at this level of time dither is negligible.

Figure 4:
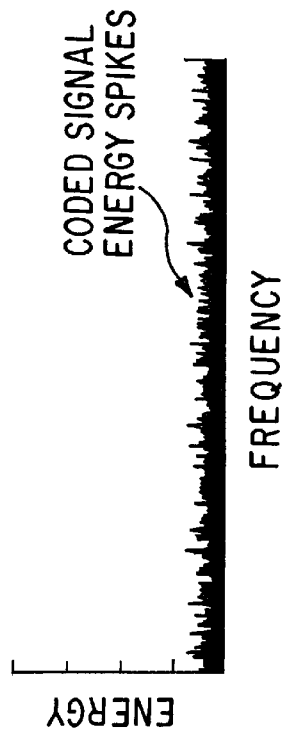
FIG. 4 is a plot illustrating the impact of pseudo-random dither on energy distribution in the frequency domain in accordance with the present invention.

Impulse radio achieves optimal smoothing by applying to each pulse a PN code dither with a much larger magnitude than the modulation dither. FIG. 4 is a plot illustrating the impact of pseudo-random dither on energy distribution in the frequency domain. FIG. 4, when compared to FIG. 2B, shows the impact of using a 256 chip (modulo) PN code relative to an uncoded signal.

PN dithering also provides for channelization (channelization is a procedure employed to divide a communications path into a number of channels). In an uncoded system, differentiating between separate transmitters would be very hard. PN codes create channels, if the codes themselves are relatively orthogonal (i.e., there is low correlation and/or interference between the codes being used).

E. Reception and Demodulation

Clearly, if there were a large number of impulse radio users within a confined area, there might be mutual interference. Further, while the use of the PN coding minimizes that interference, as the number of users rises the probability of an individual pulse from one user's sequence being received simultaneously with a pulse from another user's sequence increases. Fortunately, implementations of an impulse radio according to the present invention do not depend on receiving every pulse. The impulse radio receiver performs a correlating, synchronous receiving function (at the RF level) that uses a statistical sampling of many pulses to recover the transmitted information.

Impulse radio receivers typically integrate 200 or more pulses to yield the demodulated output. The optimal number of pulses over which the receiver integrates is dependent on a number of variables, including pulse rate, bit rate, jamming levels, and range.

F. Jam Resistance

Besides channelization and energy smoothing, the PN coding also makes impulse radio highly resistant to jamming from all radio communications systems, including other impulse radio transmitters. This is critical as any other signals within the band occupied by an impulse signal act as a jammer to the impulse radio. Since there are no unallocated 1+GHz bands available for impulse systems, they must share spectrum with other conventional and impulse radios without being adversely affected. The PN code helps impulse systems discriminate between the intended impulse transmission and transmissions from others.

Figure 5:
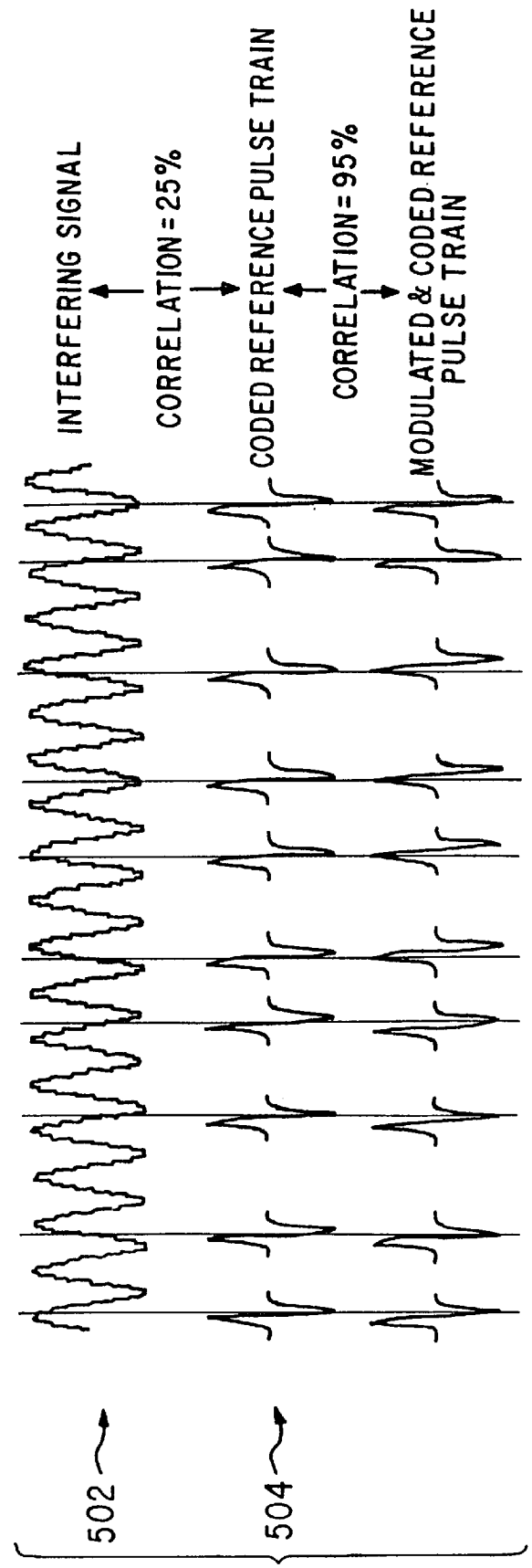
FIG. 5 illustrates the result of a narrowband sinusoidal (interference) signal overlaying an impulse radio signal in accordance with the present invention.

FIG. 5 illustrates the result of a narrowband sinusoidal jamming (interference) signal 502 overlaying an impulse radio signal 504. At the impulse radio receiver, the input to the cross correlator would include that narrowband signal 502, as well as the received ultrawide-band impulse radio signal 504. Without PN coding, the cross correlator would sample the jamming signal 502 with such regularity that the jamming signals could cause significant interference to the impulse radio receiver. However, when the transmitted impulse signal is encoded with the PN code dither (and the impulse radio receiver is synchronized with that identical PN code dither) it samples the jamming signals randomly. According to the present invention, integrating over many pulses negates the impact of jamming.

In statistical terms, the pseudo-randomization in time of the receive process creates a stream of randomly distributed values with a mean of zero (for jamming signals). Therefore, to eliminate the impact of jammers all that is necessary is to sample over enough pulses (i.e., integrate over a sufficiently large number of pulses) to drive the impact of the jamming signals to zero.

G. Processing Gain

Impulse radio is jam resistant because of its large processing gain. For spread spectrum systems, the definition of processing gain, which quantifies the decrease in channel interference when wide-band communications are used, is the ratio of the bandwidth of the channel to the bandwidth of the information signal. For example, a direct sequence spread spectrum system with a 10 kHz information bandwidth and a 16 MHz channel bandwidth yields a processing gain of 1600 or 32 dB. However, far greater processing gains are achieved with impulse radio systems where, for the same 10 kHz information bandwidth and a 2 GHz channel bandwidth, the processing gain is 200,000 or 53 dB.

The duty cycle (e.g., of 0.5%) yields a process gain of 28.3 dB. (The process gain is generally the ratio of the bandwidth of a received signal to the bandwidth of the received information signal.) The effective oversampling from integrating over multiple pulses to recover the information (e.g., integrating over 200 pulses) yields a process gain of 28.3 dB. Thus, a 2 GHz divided by a 10 mpps link transmitting 50 kilobits per second (kbps) would have a process gain of 49 dB, (i.e., 0.5 ns pulse width divided by a 100 ns pulse repetition interval would have a 0.5% duty cycle, and 10 mpps divided by a 50,000 bps would have 200 pulses per bit.)

H. Capacity

Figure 6:
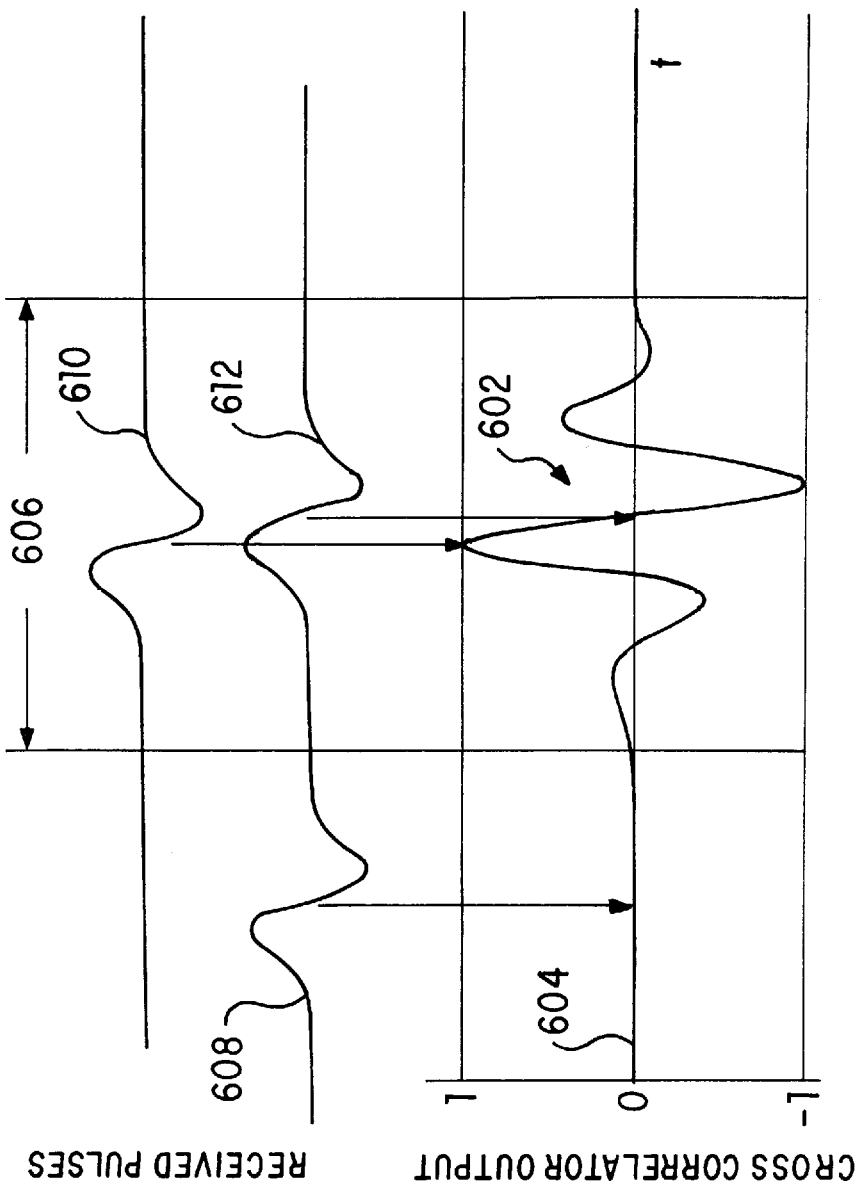
FIG. 6 shows the "cross correlator" transfer function of an impulse radio receiver in accordance with the present invention.

Theoretical analyses suggests that impulse radio systems can have thousands of voice channels per cell. To understand the capacity of an impulse radio system one must carefully examine the performance of the cross correlator. FIG. 6 shows the "cross correlator transfer function" 602. This represents the output value of an impulse radio receiver cross correlator for any given received pulse. As illustrated at 604, the cross correlator's output is 0 volts when pulses arrive outside of a cross correlation window 606. As a received pulse 608 slides through the window, the cross correlator output varies. It is at its maximum (e.g., 1 volt) when the pulse is $\tau/4$ ahead of the center of the window (as shown at 610), 0 volts when centered in the window (as shown at 612); and at its minimum (e.g., −1 volt) when it is $\tau/4$ after the center (not shown).

When the receiving system is synchronized with the intended transmitter, the cross correlator's output has a swing of between ±1 volt (as a function of the transmitter's modulation). Other in-band transmission would cause a variance to the cross correlator's output value. This variance is a random variable and can be modelled as a Gaussian white noise signal with a mean value of 0. As the number of interferers increases, the variance increases linearly. By integrating over a large number of pulses, the receiver develops an estimate of the transmitted signal's modulation value. Mathematically:

$$\text{Variance of the Estimate} = \frac{N\sigma}{\sqrt{Z}} \tag{8}$$

Where N=number of interferers, $\sigma$ is the variance of all the interferers to a single cross correlation, and Z is the number of pulses over which the receiver integrates to recover the modulation.

This is a good relationship for a communications system, for as the number of simultaneous users increases, the link quality degrades gradually (rather than suddenly).

I. Multipath and Propagation

Multipath fading, the bane of sinusoidal systems, is much less of a problem (i.e., orders of magnitude less) for impulse systems than for conventional radio systems. In fact, Rayleigh fading, so noticeable in cellular communications, is a continuous wave phenomenon, not an impulse communications phenomenon.

In an impulse radio system, in order for there to be multipath effects special conditions must persist. First, the path length traveled by the scattered pulse must be less than the pulse's width times the speed of light. Second, successively emitted pulses at the transmitter may arrive at the receiver at the same time neglecting the decorrelation benefits of time coding.

For the former (with a one nanosecond pulse), that equals 0.3 meters or about 1 foot (i.e., 1 ns×300,000,000 meters/second). (See FIG. 7, in the case where the pulse traveling "Path 1" arrives one half a pulse width after the direct path pulse.)

For the latter (with a 1 megapulse per second system), that would be equal to traveling an extra 300, 600, 900, etc. meters. However, because each individual pulse is subject to the pseudo-random dither, these pulses are decorrelated.

Figure 7:
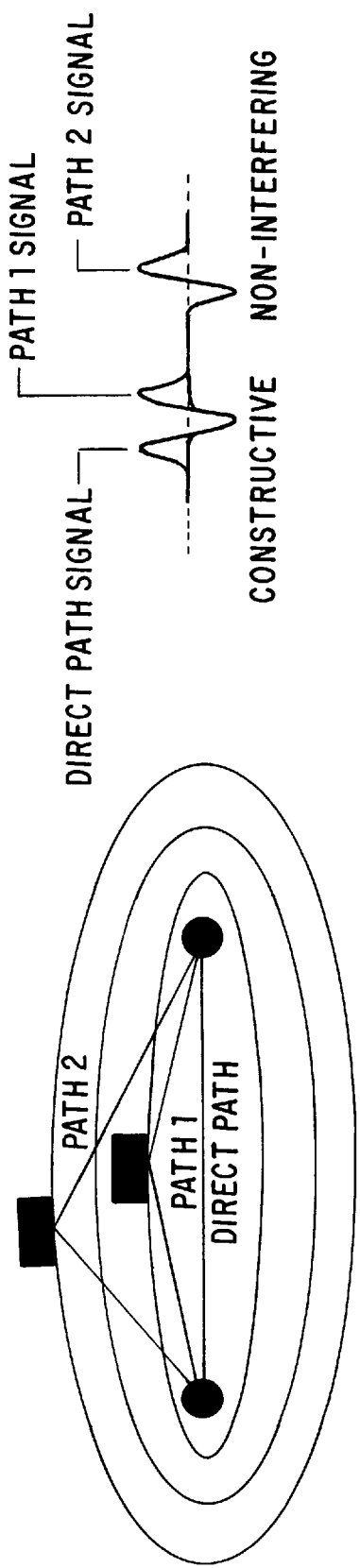
FIG. 7 illustrates impulse radio multipath effects in accordance with the present invention.

Pulses traveling between these intervals do not cause self-interference (in FIG. 7, this is illustrated by the pulse traveling Path 2). However, pulses traveling grazing paths, as illustrated in FIG. 7 by the narrowest ellipsoid, create impulse radio multipath effects.

Figure 8:
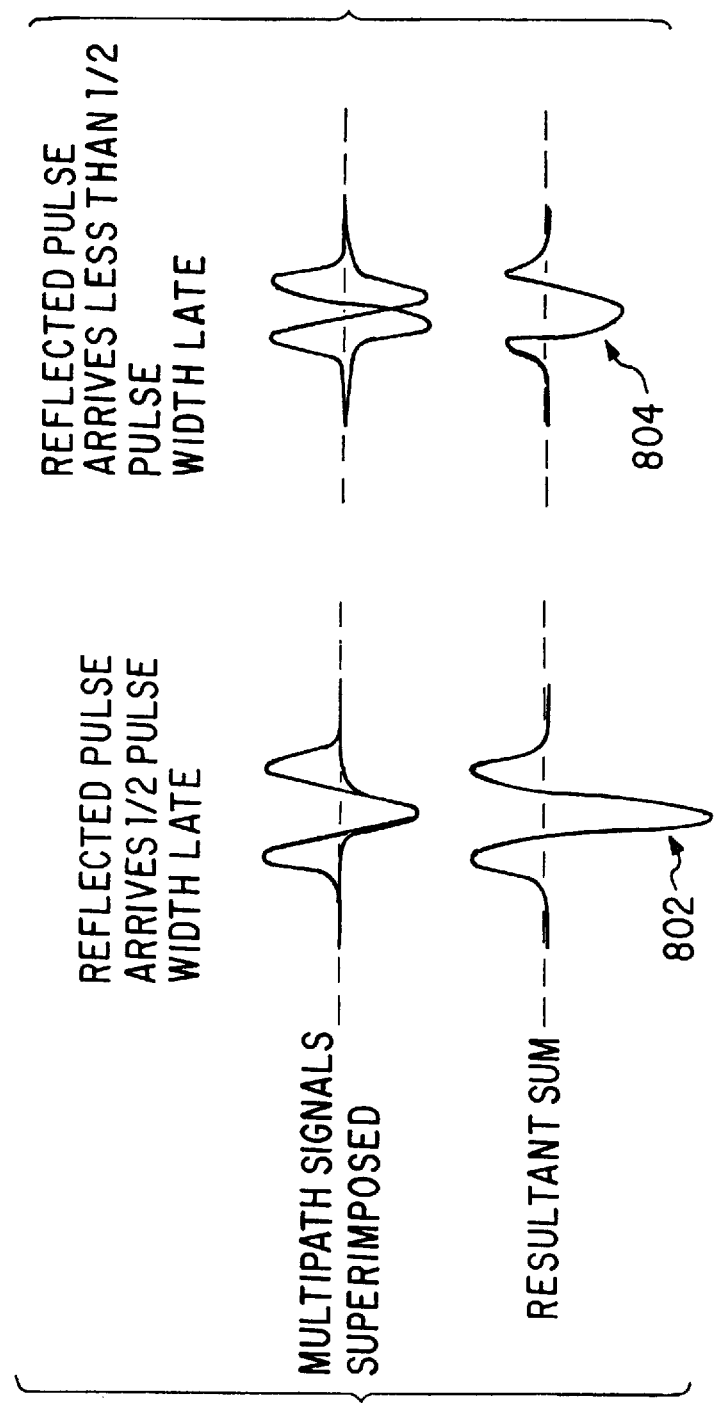
FIG. 8 illustrates the phase of the multipath pulse in accordance with the present invention.

As illustrated in FIG. 8 at 802, if the multipath pulse travels one half width of a pulse width further, it increases the power level of the received signal (the phase of the multipath pulse will be inverted by the reflecting surface). If the pulse travels less than one half a pulse width further, it will create destructive interference as shown at 804. For a 1 ns pulse, for example, destructive interference will occur if the multipath pulse travels between 0 and 15 cm (0 and 6 inches).

Tests of impulse radio systems (including impulse radar tests) suggest that multipath will not present any major problems in actual operation. Additionally, shorter pulse widths are also envisioned, which will further reduce the probability of destructive interference (because the reflected path length required for destructive interference will be shortened).

III. Fast Locking Mechanism for Channelized Ultrawideband Communications

Figure 9:
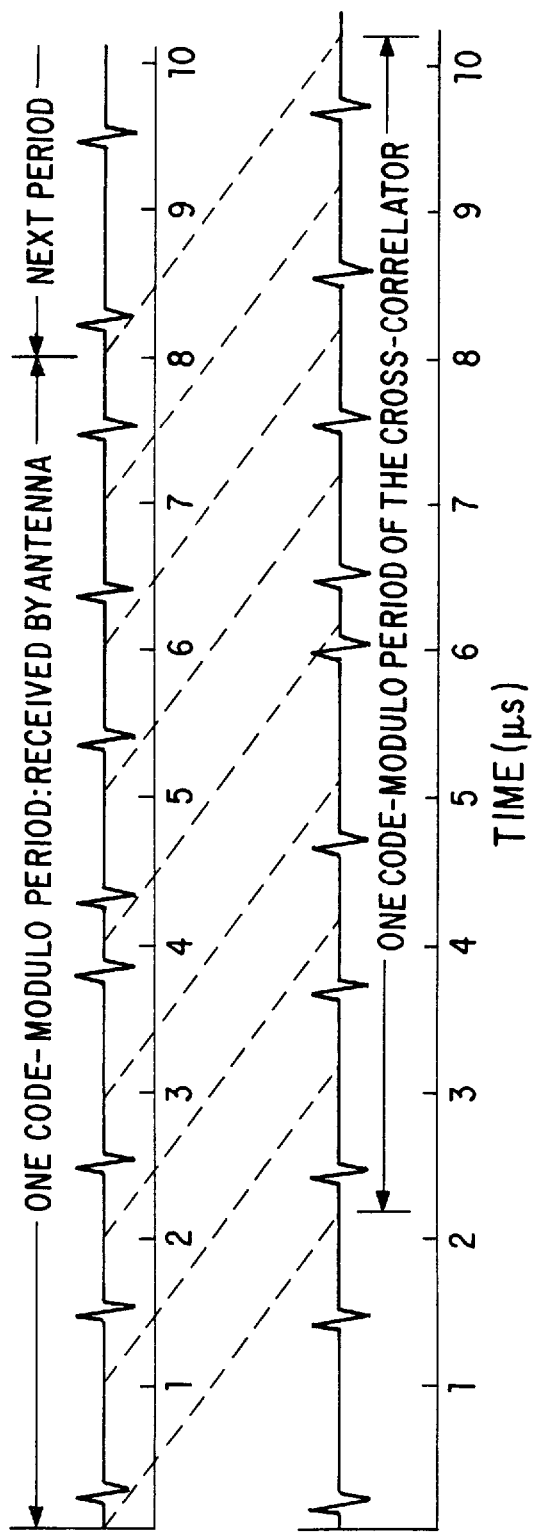
FIG. 9 illustrates acquisition using a conventional method of a sliding correlation.
Figure 10:
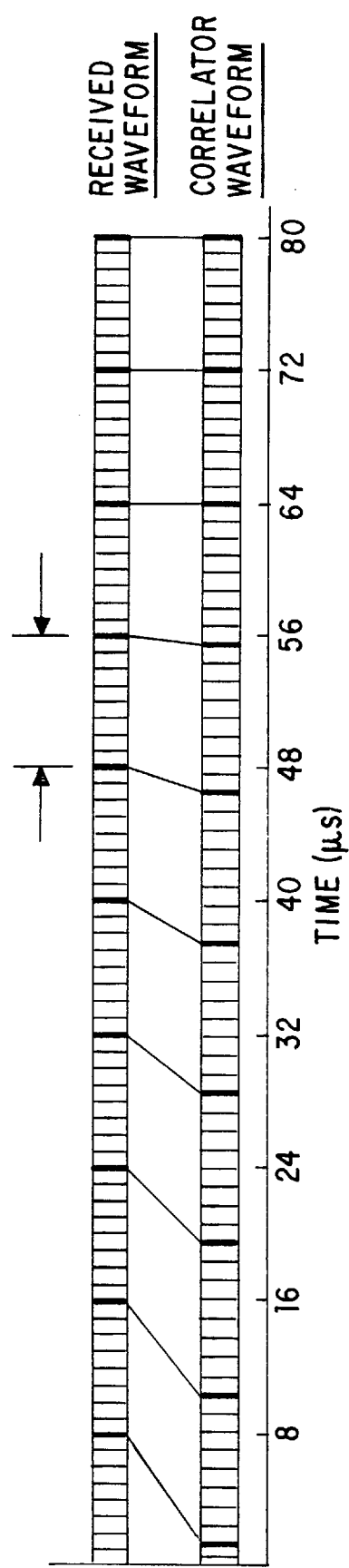
FIG. 10 shows misalignment of two time bases in accordance with the present invention.

FIG. 9 illustrates acquisition using a conventional method of a sliding correlation. This figure shows a short sequence of eight pulses (chips)/modulo with a chip frame period of 1 microsecond ($\mu$s). Here the receiver is shown out of synchronization with the received pulse train. As shown in this figure, the monocycle pulse may occur anywhere in the chip frame due to dithering. The time difference between the received waveform and the cross correlator are shown in FIG. 9 to differ by only about 2.2 $\mu$s. The time scales illustrated in this figure are greatly exaggerated. At the time scales shown, the monocycle pulses are sub-nanosecond waveforms and would be invisible. Furthermore, in reality, the chip modulo would be 256 or some higher power of 2. Further still, the chip modulo may be a non-repeating code, or the like. FIG. 10 shows misalignment of two time bases illustrated as blocks using a larger time scale than that shown in FIG. 9. Each block of eight units indicates the period of a code modulo (8 $\mu$s) and the smaller blocks are the chip frame time, within which a single, time coded monocycle pulse will occur. According to the present invention, the interpulse period of the correlator is initially set to be slightly different than that of the received waveform, which is shown at the left hand side of this figure to be longer. The receiver's correlator comes into alignment at approximately the 64 $\mu$s mark and thereafter maintains synchronization using feedback to adjust the correlator period to match that of the received waveform.

In the simple sliding lock technique of FIG. 9, the receiver's correlator PN time-hopping code progresses through its entire code modulo at a rate slightly faster than the corresponding code generator in a transmitter with which it is attempting to acquire a lock. This rate is determined by either the maximum offset frequency of an adjustable time base (typically a voltage control crystal oscillator or VCXO) or by the maximum rate of change of the frequency of the adjustable time base. Therefore, up to eight periods must be scanned past each other in order to find the desired alignment. For example, an impulse radio transmitter operating at 1 mega (M) pulses per second (pps) may be scanned by a receiver operating at a 20 ppm offset, which is a rate of 1/(20 Hz)=0.05 seconds per chip, where a chip is defined as 1 monocycle pulse. In other words, a link using a code modulo of 250 pulses will take 12.5 seconds to be scanned. However, if the center frequency of the monocycle is 2 GHz, the bandwidth of the correlation signal that would be presented to the error circuit for locking purposes will be 40 kHz. This is much too high a rate to control a typical VCXO, since such oscillators typically have a 1 kHz control bandwidth.

The present invention, however, allows a receiver to lock to a (received) time dither coded signal in a minimum possible time, more quickly than can be accomplished by a simple sliding correlation search as described in connection with FIG. 9. According to the present invention, the phase of the receiver adjustable time base is intentionally counted through its cycle with either an occasional duplicated or dropped chip. This has the effect of jumping the phase of the receivers code generator one whole chip (for example) with respect to the transmitter's code generator without the necessity of sliding the correlator pulse to the next received pulse phase. While this is being done, the adjustable time base is also allowed to run either slightly faster or slower than the repetition rate of the transmitter, thus allowing the receiver's cross correlator to slide across the time between two pulses of the received signal. With the proper settings in the receiver, all possible timing and code phases are examined during the drift from one pulse to the next.

The calculation of required dwell time of the receiver code phase is based on the amount of energy contained in the received pulse. Generally, it is simply the same as the number of pulses used by the receiver to assemble one bit, usually more than about 16 pulses, but in high noise environments this could require thousands of pulses. In this way, the signal-to-noise ratio of the noise acquisition process will be similar to that of the data recovery circuit in the receiver. According to a preferred embodiment, an address counter driving a read only memory (ROM) containing the code table, is allowed to count successive time code values for enough steps to allow that number of pulses to be integrated to determine whether the current phase (code phase) is the proper one. Then the counter is either incremented or decremented by one or more counts to slip the phase of the correlator. This process is repeated continuously until all phases are tested at the current time position (pulse phase) or until coincidence of the received signal in the template signal is detected. As noted above, an adjustable time base in the receiver is adjusted to allow the correlator to drift in pulse phase at the rate which allows all of the possible code phases to be tested at each of the possible pulse phases.

Figure 11:
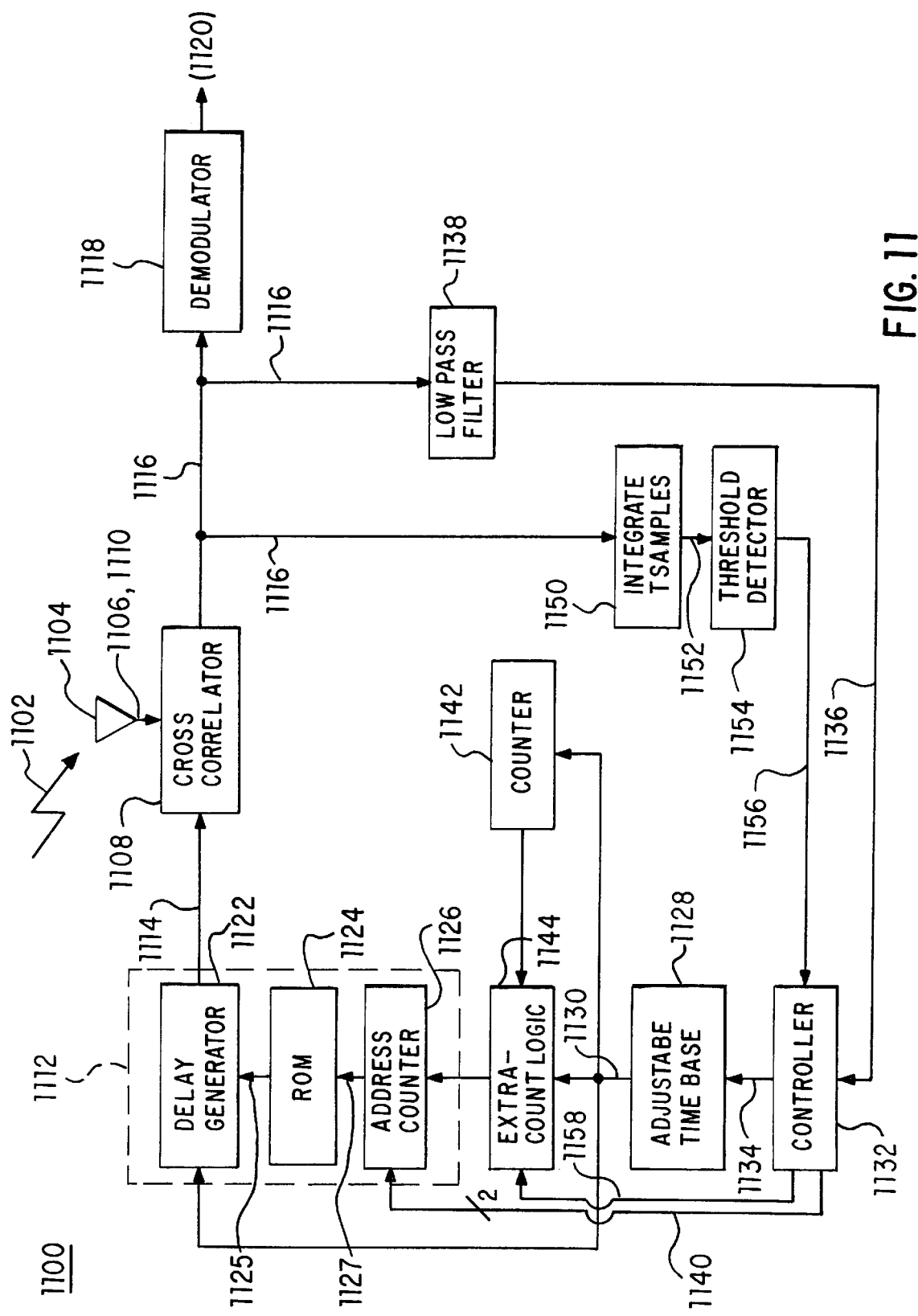
FIG. 11 shows a representative block diagram of an impulse radio receiver for fast lock, in accordance with the present invention.

A representative block diagram of an impulse radio receiver 1100 is shown in FIG. 11. Receiver 1100 receives impulse radio signals 1102 propagated through a propagation medium (not shown) at an antenna 1104. A received signal 1106 is input to a cross correlator 1108 via a receiver transmission line 1110 coupled to the antenna 1102. A decode timing modulator (dashed box) 1112 produces a decode signal 1114, which is provided to the cross correlator 1108. The cross correlator 1108 cross correlates the received signal 1106 with the decode signal 1114 and outputs a baseband signal 1116. Once signal acquisition and lock are made, as described below, the baseband signal 1116 is demodulated by a demodulator 1118, which outputs a demodulated information signal 1120.

The receiver 1100 also comprises an adjustable time base 1128. The adjustable time base 1128 generates a periodic timing signal 1130. A controller 1132 generates a rate control signal 1134 to control the rate of the periodic timing signal 1130. The controller 1132 receives an error signal 1136, which is a low pass filtered version of the baseband signal 1116, via a low pass filter 1138.

Decode timing modulator 1112 comprises a (binary-to-time) delay generator 1122, a PN code and linearization read only memory (ROM) 1124, and an address counter and limit logic block 1126. Start address and stop address signals are provided to the address counter and limit logic block 1126 from the controller 1132 via lines shown at 1140. Addresses are output from the address counter and limit logic block 1126 via a bus 1127. The address counter and limit logic block 1126 provides addresses to access the PN code and linearization ROM 1124 when triggered by the periodic timing signal 1130 provided by the adjustable time base 1128. A PN code (that corresponds to a known PN code used by an impulse radio transmitter) is output by the PN code and linearization ROM 1124 via a bus 1125 and is provided to the (binary-to-time) delay generator 1122. The (binary-to-time) delay generator 1122 time modulates the periodic timing signal 1130 to generate the decode signal 1114.

Further details of delay generator 1122, read only memory (ROM) 1124 and address counter 1126 of the decode timing modulator 1112, as well as the operation of the cross correlator 1108 and demodulator 1118 are fully described in copending U.S. Pat. No. 5,677,927 and 08/428,489, U.S. Pat. No. 5,687,169 (Attorney Docket No. 1321.0150000). For example, the adjustable time base 1128 can comprise a programmable divider (not shown) and a voltage controlled oscillator (VCO) (not shown), which are used to output the periodic timing signal 1130. A voltage control signal is provided to the VCO from the controller 1132 to adjust the VCO output, as will be apparent to a person skilled in the relevant art.

The cross correlator output is a wide band baseband signal (1116), which is on the order of half the pulse repetition rate. For example, a 5 Mpps rate would yield a 2.5 MHz wide baseband signal (0–2.5 MHz). The section of that bandwidth that is of interest to the lock loop is in the kilo hertz range and below. Therefore, the low pass filter 1138 cuts off frequencies above about 10 kHz, unless a high speed lock process (i.e., acquisition scheme) is employed, in which case 100 kHz may be the cutoff. Assuming that the controller 1132 is a microprocessor or a digital signal processor (DSP), such as a TMS320C40 DSP (manufactured by Texas Instruments, Dallas, Tex.), or the like, the high frequency does not affect the VCO (not shown) directly, and is easily handled by the DSP, which in turn controls the VCO.

Figure 12:
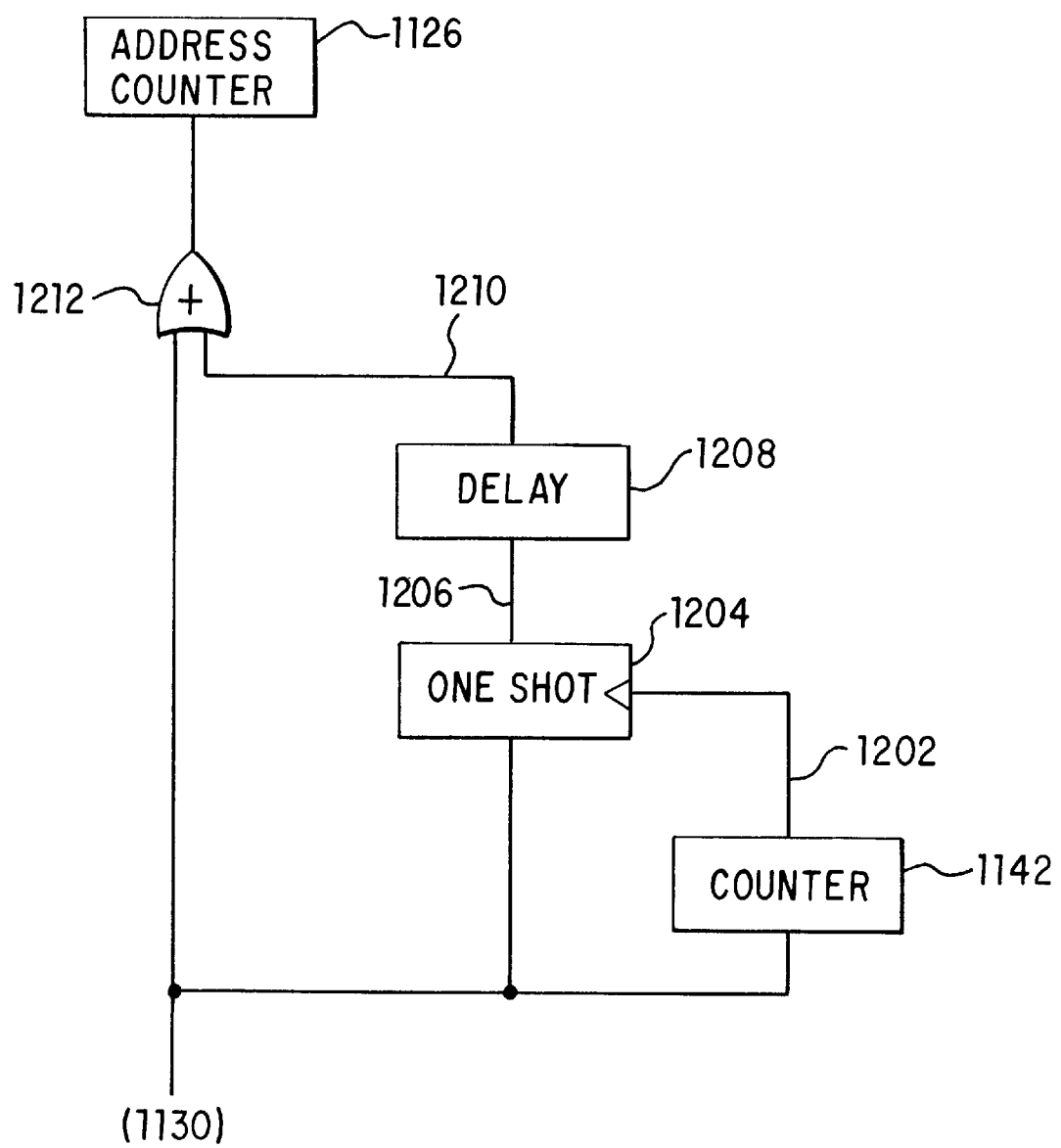
FIG. 12 shows an exemplary block diagram for the extra-count logic of the receiver in FIG. 11.

Additional logic for acquisition and fast lock of impulse signals includes a counter 1142 that determines whether or not T chips have been integrated using the current code phase. If so, an extra count is added using discrete, extra-count logic 1144. Exemplary logic is shown in FIG. 12. In this example, counter 1142 is a 16-chip counter that produces an output every T (16 for example) chips of the code modulo. The output 1202 of the counter enables a one shot monostable timer 1204. The inputs of the counter 1142 and the monostable timer 1204 are triggered by the periodic timing signal 1130. An output 1206 of the monostable timer 1204 must be delayed by a delay element 1208 to avoid overlapping of its output 1210 (called the "extra count") with the periodic timing signal 1130. The extra count output of the delay element is ANDed (via a gate 1212) with the periodic timing signal 1130 and input to the address counter 1126.

Lock is detected via integration of T samples (see block 1150) and comparison of a integration result 1152 via a threshold detector 1154. The threshold detector 1154 outputs a channel coincidence signal 1156 to the controller 1132. Once coincidence is detected, the controller 1132 disables the extra-count logic via a stop extra-count signal 1158, thus implying signal lock.

IV. Fast Locking Analysis and Operation

Figure 13:
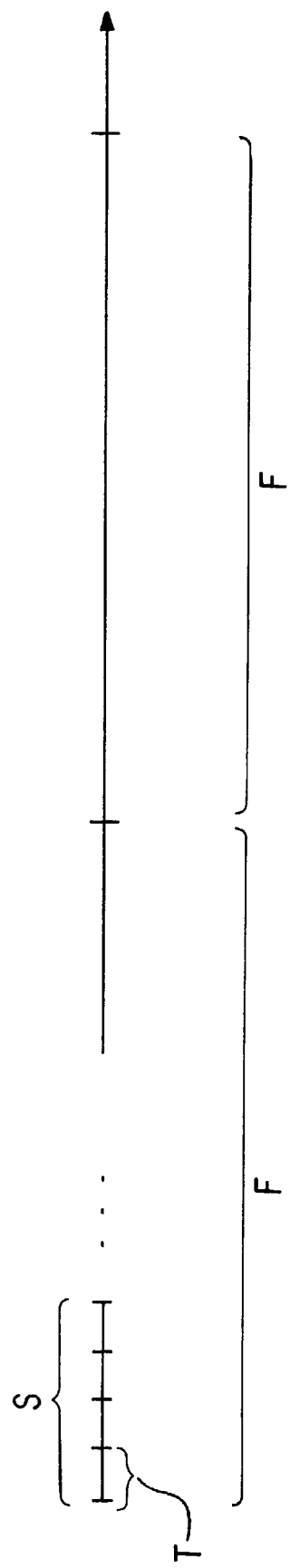
FIG. 13 illustrates pulse width τ (tau) and frame (F) length of a monocycle pulse.

FIG. 13 illustrates pulse width $\tau$ (tau) and frame length (F) (i.e., the pulse-to-pulse interval) of a monocycle pulse (not shown). For explanation and analysis of acquisition and fast locking according to the present invention, the pulse width $\tau$ is subdivided into s sampling windows (4 sampling windows are shown in the figure). A trial number (T) represents the number of pulses integrated by the integrator 1150 per sampling window, prior to shifting the code count via the extra-count logic 1144. The code's modulo length is M, which for this analysis M=256.

Given a center frequency of 2 GHz, the monocycle pulse width $\tau$ is $0.5 \times 10^{-9}$ sec. for this example, and the frame width is $1 \times 10^{-6}$ sec. The total number of samples per frame is thus:

$$F_s = \frac{F \cdot s}{\tau} \tag{9}$$

Using the above exemplary values, $F_s$=8000 samples. The worst case number of pulses to acquire code phase coincidence to result in a signal lock is:

$$F_T = F_s \cdot T \cdot M \tag{10}$$

Which, using the above exemplary values, $F_T = 3.3 \times 10^7$ pulses. Finally, the worst case time period to acquire code phase coincidence is:

$$t_1 = F_T \cdot F \tag{11}$$

Which, using the above exemplary values, $t_1$=32.8 sec. Modifications in operation and/or hardware can be made to the lock mechanism to greatly reduce this seemingly high value.

For example, the cross correlation rate can be speed-up by one or two orders of magnitude. This will, however, increase the cost of the cross correlator. Alternatively, a plurality of less expensive cross correlators can be used in parallel. Each cross correlator in this case would correlate a different section of the code, and the cross correlated results would need to be separately integrated for threshold detection.

Figure 14:
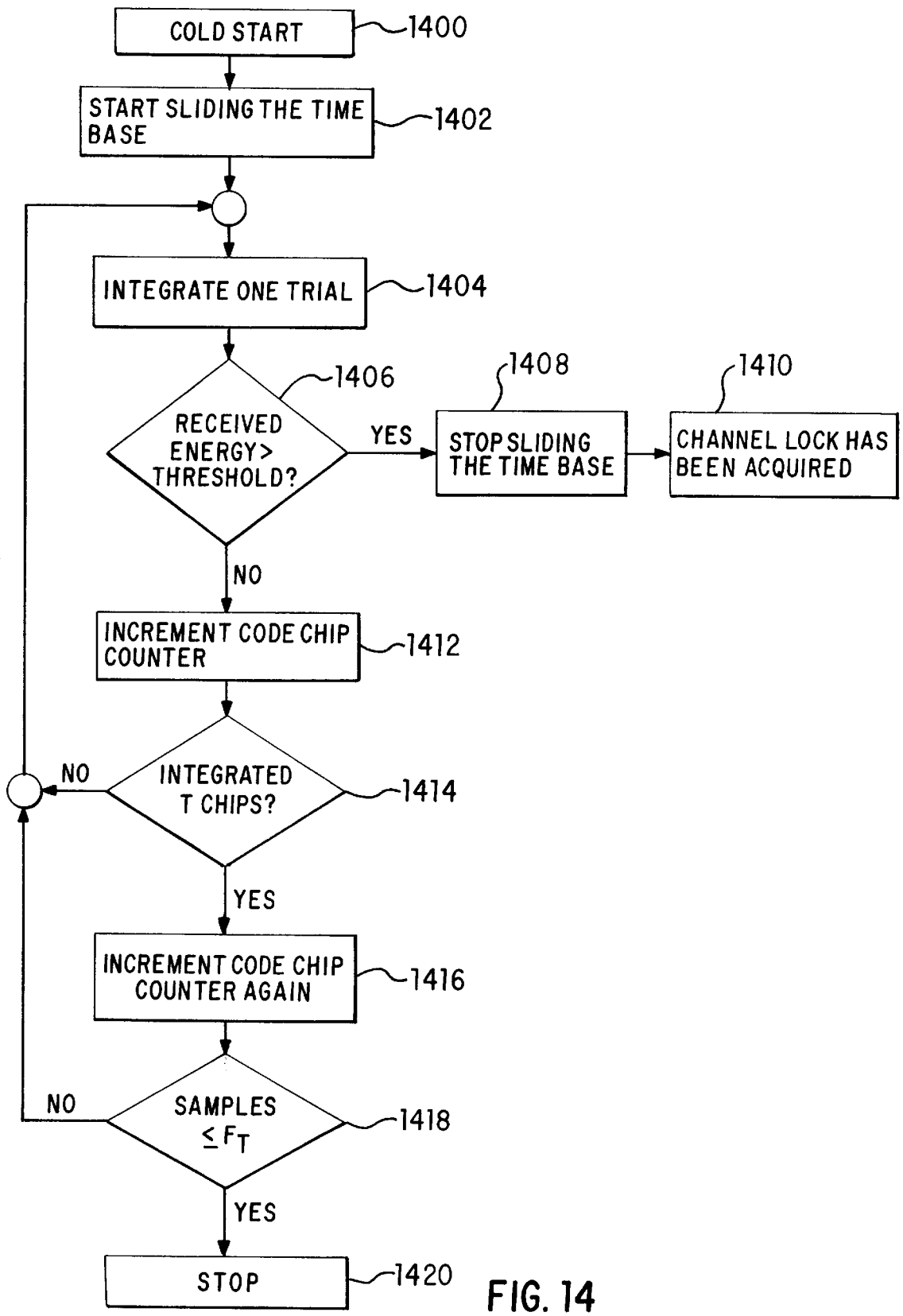
FIG. 14 shows a flow diagram illustrating operation of signal acquisition and lock according to the present invention.

FIG. 14 shows a flow diagram illustrating operation of signal acquisition and lock according to the invention. From a cold start 1400, the receiver's controller 1132 starts sliding the rate of the adjustable time base, as shown at 1402. One trial worth of correlation results are integrated, at a step 1404, and received energy is compared to the threshold, at a step 1406. If coincidence is detected (see "Yes" result of conditional statement 1406) the controller stops sliding the time base (at 1408) to maintain signal lock (at 1410). If the threshold is not exceeded (see "No" result of conditional statement 1406), the address counter is incremented, as a step 1412.

The counter and 1142 then determines whether T chips have sampled, at a conditional step 1414. If so, the extra-count logic in enabled and the address counter is incremented an extra code chip, as shown at a step 1416. If T chips have not yet been sampled, no extra count is added, and the process returns to step 1404. A conditional step 1418 determines whether all $F_T$ pulses have been sampled. If so the acquisition process is stopped, at step 1420, assuming there is no impulse signal to detect; otherwise, processing continues to step 1404.

In alternative embodiments, the step 1416 need not be a single chip increment. The count can be incremented or decremented by one or more chips, or can be a random ordering so as to avoid repeating samples or missing any one sample in the modulo altogether. In fact, the modification of the chip count can be done according to an algorithm programmed into the controller or the counter. Such programming would become apparent to a person skilled in the relevant art.

V. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for acquisition and lock of an impulse radio signal, comprising the steps of:
   a. sliding a periodic timing signal using an adjustable time base;
   b. producing a decode signal using said periodic timing signal, wherein successive decode signals are coded by successive chips of a code having a predetermined modulo length;
   c. cross correlating a received impulse radio signal with said decode signal to output a baseband signal;
   d. integrating T samples of said baseband signal to output an integration result, where T is an integer;
   e. comparing said integration result with a threshold value to output a channel coincidence signal;
   f. determining whether channel coincidence has occurred using said channel coincidence signal, and
      if channel coincidence is detected, outputting a constant rate-control signal to stop said periodic timing signal from sliding, otherwise,
      if channel coincidence was not detected, adjusting said periodic timing signal and repeating steps a–f for successive T pulses of said periodic timing signal until channel coincidence is detected.

2. The method according to claim 1, further including the step of stopping acquisition if the entire modulo length is completed before channel coincidence is detected.

3. The method according to claim 1, further including the steps of:
   producing plural decode signals; and
   cross correlating received impulse radio signals with said plural decode signals using a plurality of cross correlators to reduce the time to acquire channel lock.

4. The method according to claim 1, wherein said decode signal is produced by a decode timing modulator having an address counter, and said adjusting step comprises counting T pulses of said periodic timing signal and incrementing or decrementing the address counter by a one or more extra counts after each T pulses is reached.

5. The method according to claim 1, further including the step of demodulating said baseband signal to output a demodulated information signal.

6. The method according to claim 5, wherein said demodulating step comprises a step of frequency demodulating said baseband signal to output a demodulated information signal.

7. The method according to claim 5, wherein said demodulating step comprises a step of direct digitally demodulating said baseband signal to output a demodulated information signal.

8. A receiver for acquisition and lock of an impulse radio signal, comprising:
   an adjustable time base to output a sliding periodic timing signal having an adjustable repetition rate;
   a decode timing modulator to output a decode signal in response to said periodic timing signal;
   a cross correlator to cross correlate the impulse radio signal with said decode signal and output a baseband signal;
   first means for integrating T samples of said baseband signal to output an integration result, where T is an integer;
   a threshold detector to compare said integration result with a threshold value to output a channel coincidence signal; and
   a controller to determine whether channel coincidence has occurred using said channel coincidence signal, and
      if channel coincidence is detected, to output a constant rate-control signal to stop said periodic timing signal from sliding, otherwise,
      if channel coincidence was not detected, to adjust said periodic timing signal, wherein said means for integrating and said threshold detector continue to integrate and threshold detect successive trials of T pulses of said periodic timing signal until channel coincidence is detected.

9. The receiver according to claim 8, wherein said decode timing modulator having an address counter.

10. The receiver according to claim 9, further comprising:
    a counter to count T pulses of said periodic timing signal; and
    extra count logic to increment or decrement said counter by a one or more extra counts after each T pulses is reached.

11. The receiver according to claim 8, wherein said controller includes means for stopping acquisition if an entire modulo length is completed before channel coincidence is detected.

12. The receiver according to claim 8, further comprising:
    means for producing plural decode signals; and
    a plurality of cross correlators to cross correlate received impulse radio signals with said plural decode signals to reduce the time to acquire channel lock.

13. The receiver according to claim 8, further comprising a demodulator to demodulate said baseband signal to output a demodulated information signal.

14. The receiver according to claim 13, wherein said demodulator frequency demodulates said baseband signal to output a demodulated information signal.

15. The receiver according to claim 13, wherein said demodulator direct digitally demodulates said baseband signal to output a demodulated information signal.

\* \* \* \* \*